UNITED STATES PATENT OFFICE.

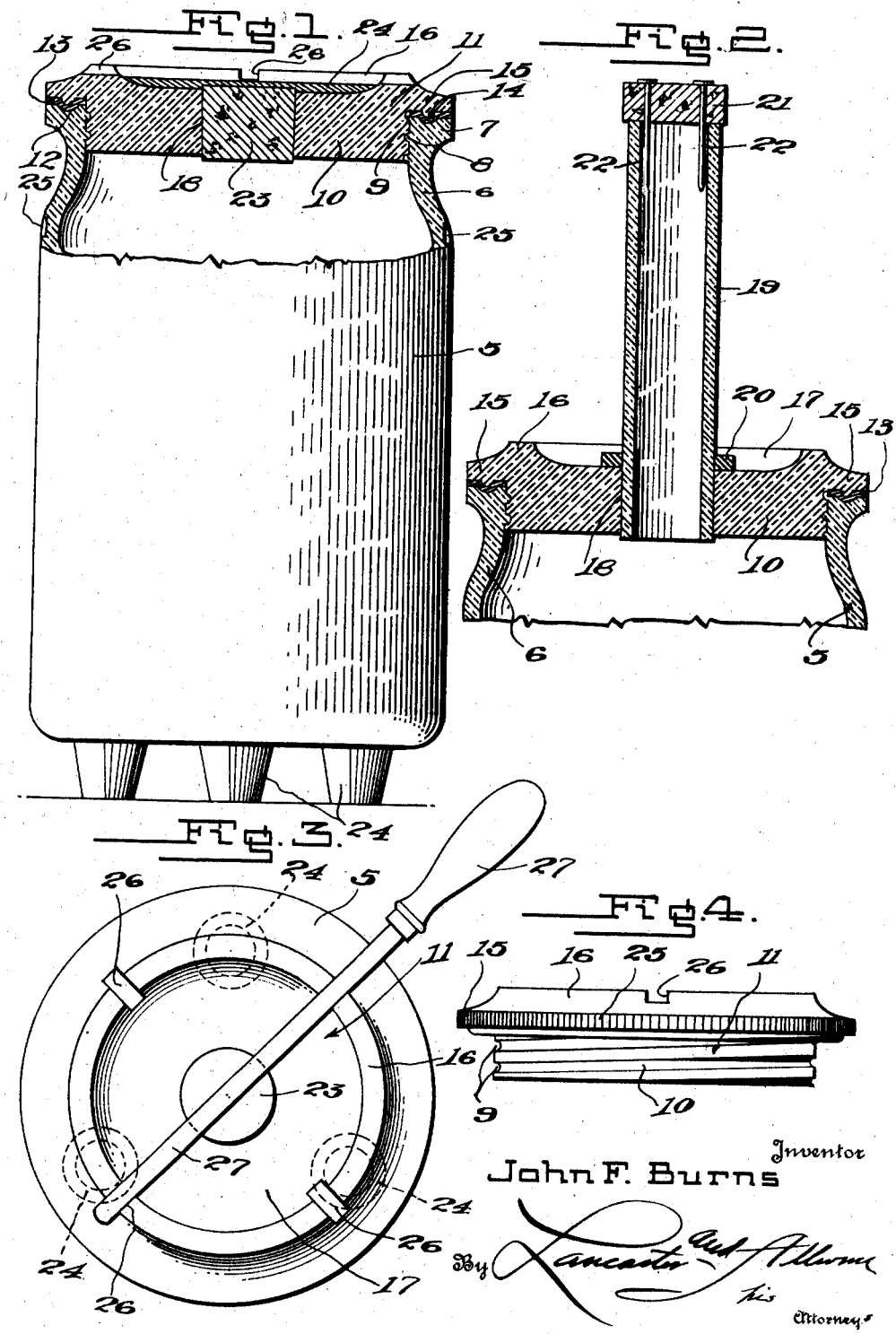

JOHN F. BURNS, OF ST. LOUIS, MISSOURI.

JAR AND APPARATUS FOR COLD-PACK METHOD OF CANNING FRUITS AND VEGETABLES.

1,396,723. Specification of Letters Patent. Patented Nov. 15, 1921.

Application filed May 26, 1919. Serial No. 299,888.

*To all whom it may concern:*

Be it known that I, JOHN F. BURNS, a citizen of the United States, residing at St. Louis, in the county of St. Louis and State of Missouri, have invented certain new and useful Improvements in Jars and Apparatus for Cold-Pack Methods of Canning Fruits and Vegetables, of which the following is a specification.

This invention relates to a preserving or canning jar for use in preserving fruits or vegetables, and more particularly to a jar and apparatus designed to facilitate the cold pack method of canning various edibles.

Tests have proven that the cold pack method of canning fruit and vegetables is superior, in the results obtained, to the old method of first cooking the fruits or vegetables, and then placing them in the preserving jar or can. However, considerable difficulty has been experienced in carrying out the cold pack method of canning in that the vegetables or fruits are placed in an uncooked cold state in the jar or can after which the latter is placed in a suitable cooker or container filled with water and boiled for a predetermined length of time. The boiling or cooking of the vegetables or fruits in the jar create gases and vapor therein which if not allowed to escape will break the jar, and it is therefore necessary when using approved ordinary types of preserving jars to leave the lids loose upon the jars to allow the escape of the gases or vapor created in the jar during the cooking, and this permits the boiling water to pass into the jar, often destroying the contents of the jar or affecting the condition and taste thereof. Furthermore, in removing the lids or covers from the ordinary type of preserving jars, considerable difficulty is often experienced and it is frequently necessary to pry or bend outwardly a portion of the head to permit the escape of air from within the jar to facilitate the removal of the cover therefrom, resulting in damaged covers or lids as well as the gasket used in connection therewith, causing an expense of new lids when it is desired to reuse the jar and quite frequently the jars themselves are broken in an endeavor to remove the cover or lid therefrom sometimes resulting in mixing of the fine particles of broken glass with the fruit or vegetables contained in the jars necessitating the throwing away of parts of the fruits or vegetables of the jar, besides rendering the jar unfit for future use.

It is an object of this invention to provide a preserving jar which will eliminate all of the above enumerated inconveniences, as well as one in which the lid or cover may be tightened upon the jar prior to its placing in the cooking vessel which cover provides means to permit the escape of the vapors and gases created in the jar during the cooking action of the contents thereof, when the pressure of said vapors and gases is of such strength as to endanger the jar. However, the said vent means is adapted to retain the vapors and gases in the jar except when they reach excessive pressure thereby adding to the taste of the fruits or vegetables in order that a limited amount of the vapors are allowed to escape, the others condensing in the jar when the latter is removed and cooled and consequently returning any flavor which might be contained therein to the contents of the jar.

Other objects of the invention will appear in the following detailed description taken in connection with the accompanying drawings, forming a part of this application and in which drawings:

Figure 1 is a side elevation of the improved jar showing the same in a sealed condition and having parts thereof broken away.

Fig. 2 is a fragmentary section through the jar showing the vents for controlling the escape of vapor from the interior of the jar applied thereto.

Fig. 3 is a top plan of the jar in a sealed position showing an opening device applied thereto for facilitating the removal of the lid or cover of the jar when it is desired to empty the contents from the jar, and Fig. 4 is a side elevation of the cover of the jar.

Referring more particularly to the drawings 5 indicates the body of the jar which is preferably constructed of glass as is ordinary in the manufacture of preserving jars or containers. The jar 5 has its upper end slightly constricted as shown at 6 in Fig. 1 of the drawings, and it is provided with an annular flange 7 about its mouth, while the inner wall of the mouth is spaced and provided with a spiral rib or thread construction 8 adapted to engage in the spiral or thread like screw 9 formed in the depending portion 10 of the cover 11 for the jar. The upper surface of the flange 7 is provided with an annular recess 12 into which the usual type of gasket 13 is forced or pressed when the cover 11 is properly mounted upon the jar 5, by means of the depending annular ribs 14 formed upon the under surface of the annular flange 15 of the cover 11, for hermetically sealing the jar.

The cover 11 is provided with an upstanding annular extension 16 which provides a depressed portion or recess 17 centrally within the top of the cover. The cover 10 is provided with an axial opening 18 extending therethrough which, during the cooking of the contents of the jar, receive the lower end of a vent tube 19. A rubber or resilient collar 20 is mounted about the tube 19 and is adapted to engage the upper surface of the cover 10 to limit the insertion of the tube 19 into the opening 18 and also to provide a fluid tight closure about the tube to prevent water from passing into the jar 5 during the cooking of the contents thereof. The tube 19 is of such length as to project out of the water in the cooking vessel in which the jar 5 is placed, and a valve member 21 is carried by the upper open end of the tube. This valve member 21 comprises a cork or other cylindrical buoyant object through which a pair of pins 22 are inserted, preferably in the manner shown in Fig. 2. It has been found desirable and practical that the said pins 22 should weigh approximately six pennyweight as thus the desired weight is given to the valve structure 21 to maintain it in a closing position for the upper end of the tube 19 under ordinary conditions, but to allow it to be unseated when the pressure of gases and vapor created by the cooking action of the contents of the jar are relatively high or of such pressure as to break the said jar, which unseating will allow escape of the vapor and consequently eliminate liability of the breaking of the jar.

After the contents of the jar have been cooked the desired length of time, the jar is removed from the cooker by means of any approved type of jar lifter and the tube 19 is removed from the opening 18. A cork 23 is then inserted into the opening 18 forming a closure therefor and a seal of paraffin, sealing wax or any analogous material as indicated at 24 is placed over the cork 23 and within the recess 17, forming an airtight seal about the cork 23.

If it is so desired, supporting legs or pedestals 24 may be formed upon the bottom of the jar 5, for separating the jar from the bottom of the cooker. If it is so desired, the periphery of the flange 15 of the shoulder formed by reducing the jar 6 may be roughened as shown at 25 to facilitate the connection between or the disconnection of the jar 5 and the cover 10. The upstanding extension or flange 16 is provided with a plurality of diametrically opposed substantially rectangular shaped recesses 26 adapted to receive therein a lever or wrench 27 to facilitate the unscrewing of the cover 10 from the jar, in case the cover sticks or is difficult to remove.

Changes in details may be made without departing from the spirit of this invention, but;

I claim:

1. In a jar and apparatus for cold pack method of canning fruits and vegetables, the combination of a jar, a cover therefor provided with an opening extending therethrough, a vent tube adapted to be inserted in said opening, a valve carried at the outlet end of said vent tube, and a resilient collar mounted upon said tube to limit its insertion into said openings and form a seal thereby.

2. In a jar and apparatus for cold pack method of canning fruits and vegetables, the combination of a jar, a cover therefor provided with an opening extending therethrough, a vent tube adapted to be inserted in said opening, a valve carried at the outlet end of said vent tube, a resilient collar mounted upon said tube to limit its insertion into said openings and form a seal thereby, and legs formed upon the bottom of said jar.

3. In a jar and apparatus for cold pack method of canning fruits and vegetables, the combination, of a jar, a cover therefor provided with an opening extending therethrough, a vent tube adapted to be inserted in said opening, a valve carried at the outlet end of said tube adapted to be unseated upon the creating of excessive vapor pressure within the jar during cooking, a closure adapted to be inserted in said opening upon removal of said vent tube therefrom, said cover provided with a depression in its upper surface adapted to receive a sealing substance to cover said closure.

4. A jar for cold pack method of canning fruits and vegetables including a body, a cover therefor provided with a depending portion adapted for insertion into the mouth of the jar, means upon said jar and said depending portions for interlocking the cover and jar, said cover provided with an opening extending therethrough, and a closure member inserted in said opening, said cover provided with a depression in its upper surface adapted to receive a sealing substance.

5. A jar for cold pack method of canning fruits and vegetables including a body, a cover therefor provided with a depending portion adapted for insertion into the mouth of the jar, means upon said jar and said depending portions for interlocking the cover and jar, said cover provided with an opening extending therethrough, a closure member inserted in said opening, said cover provided with a depression in its upper surface adapted to receive a sealing substance, legs formed upon the bottom of said jar, an upstanding annular extension formed upon the upper surface of said jar cover and provided with a plurality of wrench receiving recesses therein disposed in diametrically opposed pairs.

6. In a jar for cold pack method of canning fruits and vegetables, the combination of a jar body having an annular flange about its mouth, a cover for the jar, a depending portion formed upon said cover for insertion into the mouth of the jar, means for interlocking the depending portions in said jar, said annular flange provided with an annular depression in its upper surface, a gasket resting upon the upper surface of said flange, an annular flange formed about said cover, a depending annular rib formed upon the under surface of said flange for forcing said gasket into said annular depression, said cover provided with an opening extending therethrough, and a closure plug inserted in said opening, said cover provided with a depression in its upper surface adapted to receive a sealing substance to cover said closure plug.

7. In a jar and apparatus for cold pack method of canning fruits and vegetables, the combination of a jar, a cover therefor provided with an opening extending therethrough, means for connecting said cover and jar, means for forming a fluid tight connection between the cover and jar, a vent tube adapted to be inserted in the opening in said cover, and a valve carried by said vent tube adapted to be unseated upon the creating of excessive gas or vapor pressure within said jar.

8. In a jar and apparatus for cold pack method of canning fruits and vegetables, the combination of a jar, a cover therefor provided with an opening extending therethrough, means for connecting said cover and jar, means for forming a fluid tight connection between the cover and jar, a vent tube adapted to be inserted in the opening in said cover, a valve carried by said vent tube adapted to be unseated upon the creating of excessive gas or vapor pressure within said jar, and means for limiting the insertion of said vent tube into said opening 9. In a jar and apparatus for cold pack method of canning fruits and vegetables, the combination of a jar, a cover therefor provided with an opening extending therethrough, means for connecting said cover and jar, means for forming a fluid tight connection between the cover and jar, a vent tube adapted to be inserted in the opening in said cover, a valve carried by said vent tube adapted to be unseated upon the creating of excessive gas or vapor pressure within said jar, means for limiting the insertion of said vent tube into said opening, and a closure adapted to be inserted in said opening upon removal of said vent tube therefrom.

JOHN F. BURNS.